Nov. 18, 1930. V. BAL 1,782,227
HAY LOADER
Filed Jan. 4, 1930
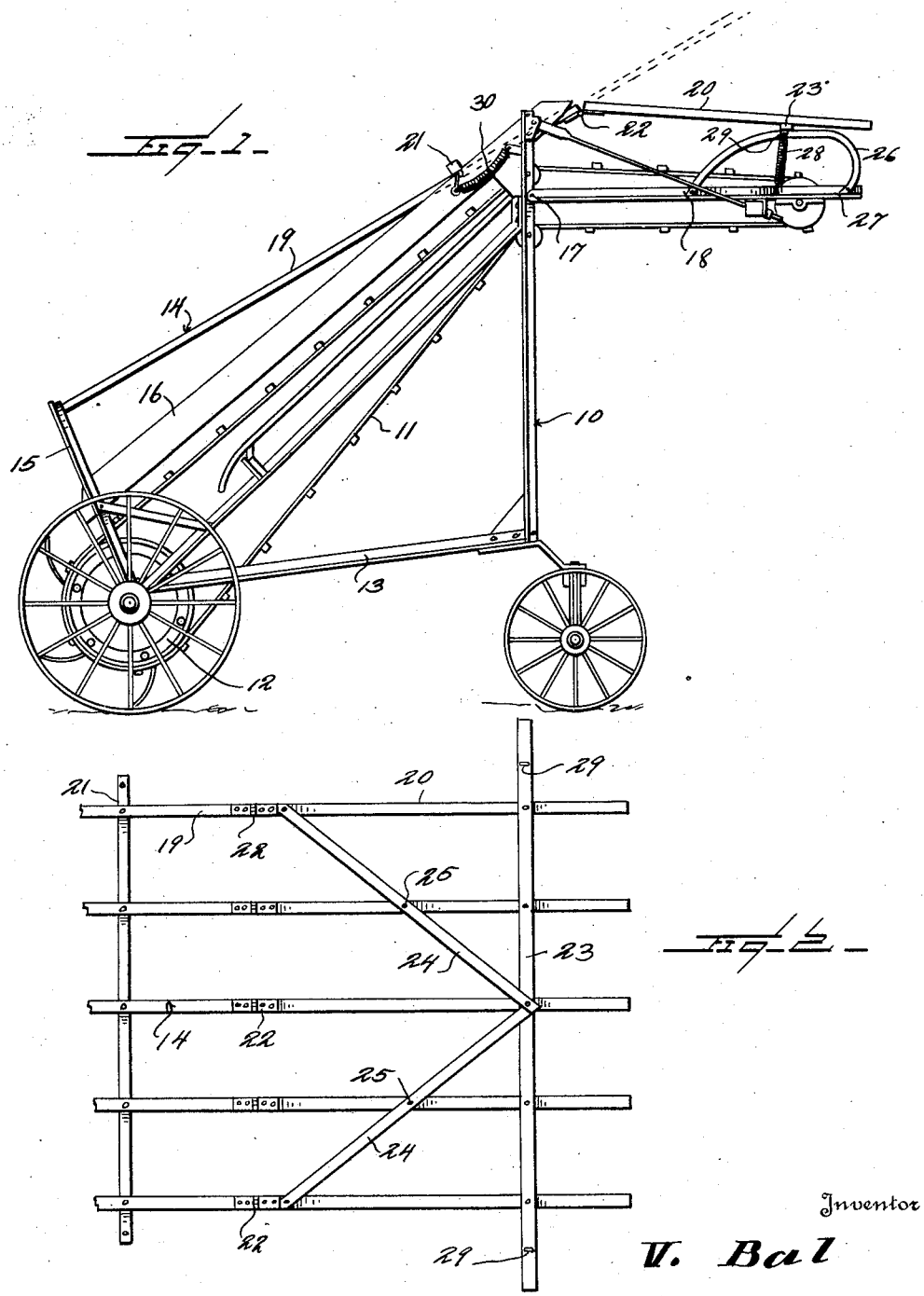
Inventor
*V. Bal*
By *Watson E. Coleman*
Attorney Patented Nov. 18, 1930

1,782,227

UNITED STATES PATENT OFFICE

VICTOR BAL, OF HYANNIS, NEBRASKA

HAY LOADER

Application filed January 4, 1930. Serial No. 418,570.

The present invention relates to improvements in hay loaders.

An object of this invention is to provide a device of this character which is adapted to be mounted on a hay loader of conventional construction and which is adapted to prevent the hay from being blown away by the wind during the loading operation.

Another object of this invention is to provide a device of this character which is readily and cheaply manufactured and which may be mounted on the present parts of a hay loader without unduly disturbing the arrangement of the parts thereof.

A further object of this invention is to provide a device of this character which will prevent the wind from blowing away the hay particularly during the initial loading of the hay on a vehicle.

The above and various other objects and advantages of this invention will in part be described in and in part be understood from the following detailed description of the present preferred embodiment, the same being illustrated in the accompanying drawing wherein:

Figure 1 is a detailed side elevation of a hay loader having a device constructed according to the preferred embodiment of this invention mounted thereon; and Figure 2 is a fragmentary bottom plan view of the hay retaining member.

Referring to the drawing wherein like numerals of reference designate corresponding parts throughout the several views, the numeral 10 designates generally a hay loader of conventional type which is provided with an endless elevating belt 11 which is adapted to engage about a drum 12 rotatably carried by the frame 13 of the loader. The loader 10 is preferably provided with a plurality of upwardly extending bars 14 which are spacedly positioned on a substantially U-shaped frame member 15 carried by the frame 13 and in spaced relation to the guard members 16. The upper end portion of the elevator frame is hingedly secured at 17 to the frame 13 so as to permit the upper end thereof to be swung downwardly to facilitate loading of the hay or the like, particularly during the initial loading operation.

In the devices at present in use, the wind bars 14 preferably extend for the entire length of the elevator frame and when the upper end 18 is swung downwardly, a considerable space is formed between the upper ends of the wind bars 14 and the upper end portion of the endless belt 11, thereby permitting the hay to blow away. In order to prevent the hay from being blown away by the wind, particularly during the initial loading thereof, the wind bars or hay retaining members 14 are preferably constructed in two sections, a lower section 19 and an upper section 20 being hingedly secured together spaced downwardly from the upper end of the elevator and so as to permit the upper section 20 to lie substantially in parallel relation to the upper end of the elevator 11 when the upper end portion thereof has been swung downwardly.

The upper end portions of the lower section 19 of the wind bars are preferably provided with a transverse bracing member 21 which is bolted or otherwise secured to the adjacent upper ends of the bars 14, and the lower end portions of the upper section 20 are preferably provided with hinge members 22 for hingedly securing the upper section to the lower section. The upper section 20 may be provided with a transverse spacing bar or the like 23 which is adapted to hold the wind bars in spaced relation to each other, and a pair of angularly inclined bracing bars 24 may be mounted on the wind bars by bolts 25 or the like so as to maintain the bars in substantially spaced relation to each other. The opposite end portions of the transverse bar 23 are adapted to extend outwardly of the wind bars 14.

A supporting bracket member 26 of substantially U construction is mounted on the opposite side portions of the elevator frame, being secured thereto by bolts 27 or the like. The bracket member 26 is adapted to extend upwardly from the frame of the elevator and is adapted to receive the outer end portions of the transverse bars 23 for holding the upper wind bar section in spaced relation to the upper end of the elevator 11.

A yieldable or resilient spring member 28 is secured at one end to the frame of the elevator adjacent the upper end portion thereof and is adapted at the opposite end thereof to engage in eyes 29 for yieldably holding the upper wind bar section on the bracket 26. The upper end portion of the lower wind bar section 19 may be provided with yieldable members 30 for yieldably holding the wind bar section against the hay so as to prevent the hay from being blown away by the wind.

In the use of this device, the hay loader 10 may be operated in the conventional manner, the wind bars 14 being mounted at their lower ends on the frame 15. The upper end portion of the elevator 11 may be swung downwardly during the initial loading of the vehicle whereupon the upper section 20 of the wind bars will cooperatively swing downwardly being held in spaced relation to the endless belt by means of the brackets 26 which are mounted on the opposite side portions of the elevator frame. When the hay is moving upwardly on the endless belt 11, the upper end portion of the lower wind bar section 19 will be forced outwardly, the spring members 30 acting to hold the wind bars in contact with the hay so as to prevent the hay from being blown away. When the hay passes over the hinged portion 17 of the elevator frame, the upper wind bar section will in like manner constantly engage against the hay so as to prevent it from being blown away. The upper end portion of the wind bar section 20, being yieldably held against the spacing member 26, will permit any excessive quantity of hay to pass therealong in the usual manner.

It will, of course, be understood that various changes and modifications may be made in the details of construction and design of the above specifically described embodiment of the invention without departing from the spirit thereof, such changes and modifications being restricted only by the scope of the following claims.

What is claimed is:

1. In combination with a hay loader, retaining means for retaining the hay on the loader, said retaining means comprising upper and lower retaining members hingedly secured to each other, yieldable means mounted on the loader and engaging said retaining members at the opposite sides thereof whereby to hold said retaining members in contact with the hay and coactively prevent the hay from being blown away during the loading operation, a pair of U-shaped supporting members secured to said loader and adapted to engage the opposite side portions of said upper retaining member whereby to maintain said upper retaining member in spaced relation to the loader.

2. In combination with a hay loader, retaining means for retaining the hay on the loader, said retaining means comprising an upper and a lower retaining member hingedly secured to each other, yieldable means secured to said loader and engaging said retaining means at the opposite sides thereof whereby to hold said retaining members in contact with the hay and coactively prevent the hay from being blown away during the loading operation, a transverse member secured to said upper retaining member and extending outwardly of the opposite sides thereof, and supporting means secured to said loader and adapted to engage said transverse member for holding said upper retaining member in spaced relation to the loader.

3. In combination with a hay loader, retaining means for retaining the hay on the loader, said retaining means comprising upper and lower retaining members, means for hingedly securing said upper and lower retaining members together, yieldable means mounted on said loader and engaging said upper and lower retaining members at the opposite sides thereof whereby to hold said retaining members in contact with the hay and coactively prevent the hay from being blown away during the loading operation, bracing means for said upper retaining member, a transverse member secured to said upper retaining member and extending outwardly of the sides thereof, and supporting means upstanding from said loader and adapted to engage said transverse member whereby to hold said upper retaining member in spaced relation to said loader.

In testimony whereof I hereunto affix my signature.

VICTOR BAL.